April 14, 1925. 1,533,950
V. H. SCHLICH
MIXING PROCESS AND APPARATUS THEREFOR
Filed Aug. 18, 1921  2 Sheets-Sheet 1
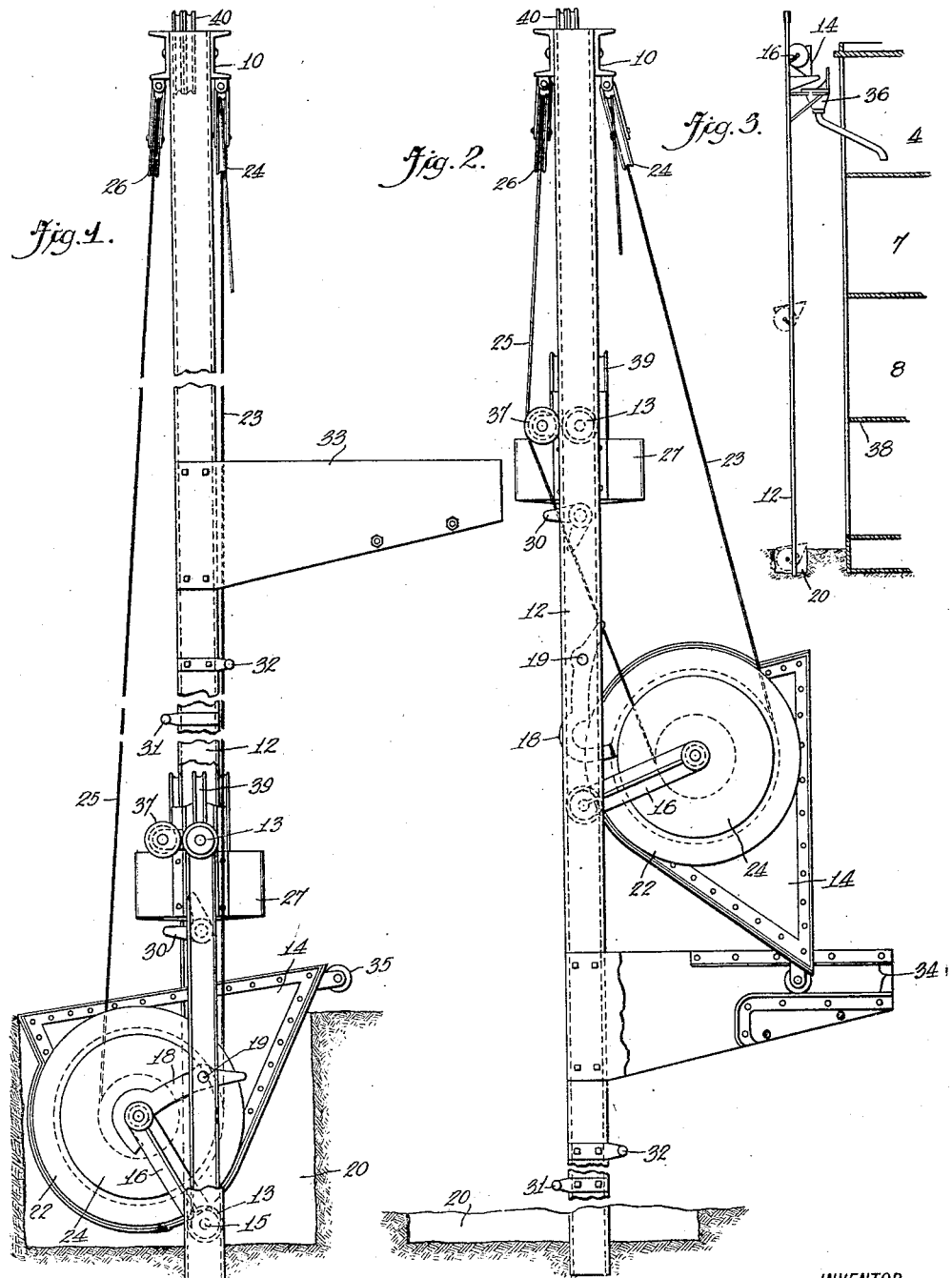
WITNESSES
INVENTOR
VICTOR H. SCHLICH
BY
ATTORNEYS

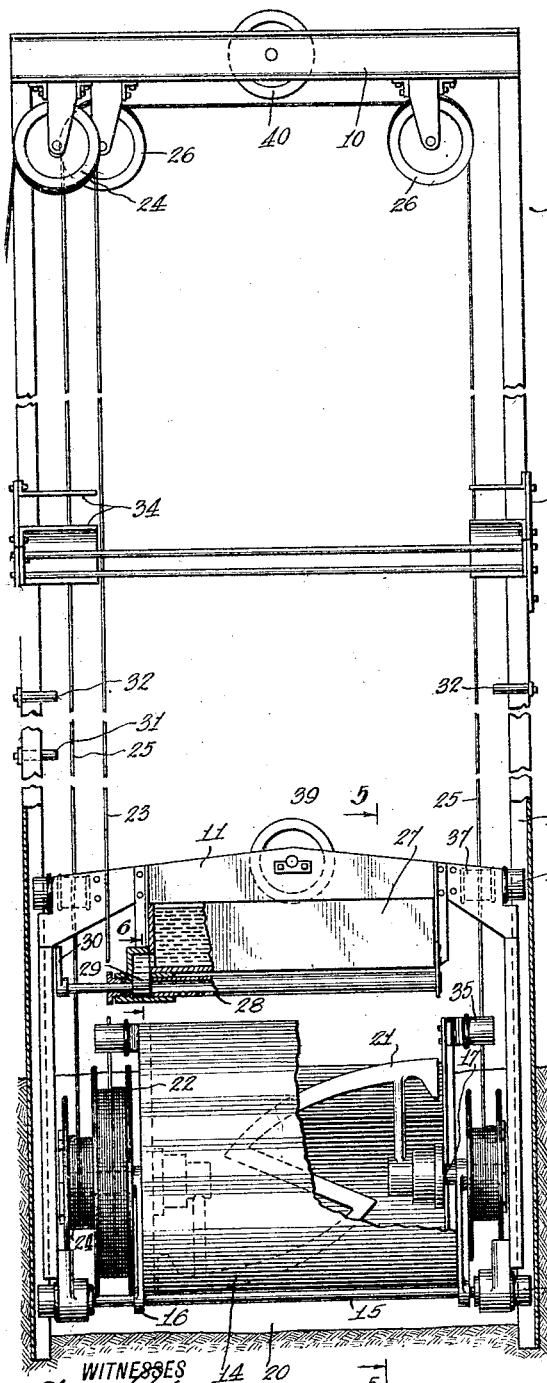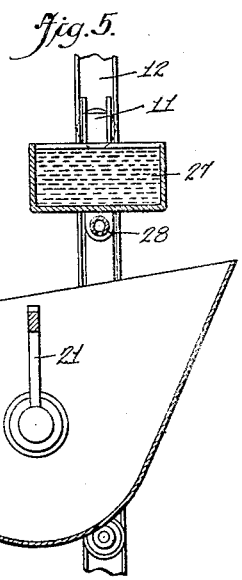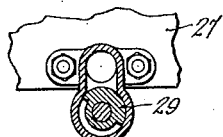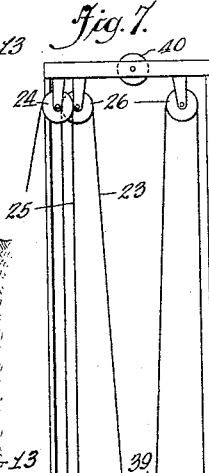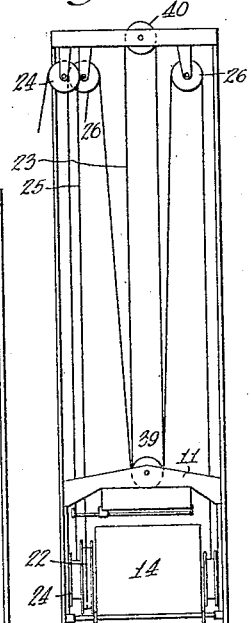

Patented Apr. 14, 1925.

1,533,950

UNITED STATES PATENT OFFICE.

VICTOR H. SCHLICH, OF SOUTHOFEN, GERMANY, ASSIGNOR TO OTTO S. SCHLICH, OF NEW YORK, N. Y.

MIXING PROCESS AND APPARATUS THEREFOR.

Application filed August 18, 1921. Serial No. 493,409.

*To all whom it may concern:*

Be it known that I, VICTOR H. SCHLICH, a citizen of Germany, and resident of Southofen, in Germany, have invented a new and Improved Mixing Process and Apparatus Therefor, of which the following is a full, clear, and exact description.

My invention relates to a process for mixing materials, such as mortar, cement, concrete, etc., together with an apparatus whereby this process may be practiced.

It is well known that the method of mixing, transporting and distributing concrete and similar cementitious substances has been practiced heretofore in various ways. The most common method resorted to in the erection of a building is that in which a mixer is utilized by means of which the concrete or other material may be prepared subsequent to which the mixture is elevated to the desired extent, subsequent to which the same is again transported manually to the point at which it is to be allowed to "set."

The most modern method however, has been that in which the mixture is prepared in the apparatus as aforedescribed, subsequent to which the mixture is hoisted in a bucket or other conveyor, from which this mixture is poured into a hopper connected to one of a series of distributing chutes through which it flows to the point at which it is to be distributed.

In practicing these two methods it has been found that the greatest amount of work, and consequently expense is involved in properly mixing the concrete or mortar, and in subsequently transporting the same to the points at which it is to be allowed to "set," this being particularly the case where the point at which the mixture is to be deposited is relatively remote from the mixing machine, or other apparatus utilized for the preparation of the same.

In this latter instance a further difficulty is experienced in that the mixed ingredients forming the completed mixture includes a relatively great amount of water, and it will be found that the conveyor utilized for transporting the mixture will be filled with virtually different strata of material. In this connection it is quite often noticed that an upper strata of water will be presented below which the cement and sand will lie, the cement in turn resting upon a strata of coarse material such as gravel, etc.

Therefore it has been found when this occurs that upon the receptacle being dumped to pour the mixture that the water will primarily flow from the receptacle, subsequent to which the moistened cement and sand will be removed from the same, this in turn being followed by the coarser material, this action obviously producing a result which is far from satisfactory, and in certain instances may cause a weakening of the entire structure being built.

This difficulty is particularly noticeable in connection with the second process, it being found that the water will gush through the distributing chutes, followed by the sticky mass of sand and cement, the coarse material trickling slowly after the cement, and in some instances necessitating outside assistance to permit of its continuing to flow down the chutes.

With this in mind my present invention aims to provide an advance in the art over both the relatively modern methods described in the preceding paragraphs, my invention furthermore providing a process and apparatus which is commercially adaptable.

A further object of my invention is the provision of a process and device of the character set forth, by means of which the conventional mixing apparatus heretofore utilized may be dispensed with.

Still another object of this invention is the provision of a process and apparatus for the mixing of materials, such as cement and mortar, and by means of which the difficulties incident to the mixture separating partly into its component elements will be avoided, thus insuring an even quality of material, resulting in the construction undertaken being of uniform strength throughout.

A still further object of this invention is that of providing a process and apparatus by means of which all guess work, incident to the preparation of a mixture will be eliminated in that each batch of material will contain exactly the correct proportion of ingredients mixed together for a predetermined length of time to insure of the production of a mixture of correct consistency.

Still other objects of my invention will become apparent in the specification, taken in connection with the drawings, which latter present one practical embodiment of my invention, and in which:

Figure 1 is a side view of the apparatus utilized and showing the parts of the same in their normal position.

Figure 2 shows the position which these parts assume when the mixture has been prepared.

Figure 3 shows the application of my apparatus to a building while in the course of construction.

Figure 4 is a partly fragmentary front view of the apparatus as illustrated in Figure 1.

Figure 5 is a transverse sectional view taken along the line 5—5 and in the direction of the arrows indicated in Figure 4.

Figure 6 is an enlarged sectional view taken along the line 6—6 and in the direction of the arrows also indicated in Figure 4, and Figures 7 and 8 show my apparatus as in Figure 4 but illustrating a slightly different arrangement of the lifting elements for a purpose hereinafter set forth.

The theory involved in my method and apparatus is that the ingredients forming the completed mixture will pour directly into a mixing trough, and the latter elevated, the ingredients being simultaneously stirred, and having a quantity of water mixed with them if this is desired, in the final stages of this stirring action the mixing trough reaching the plane at which its contents are to be removed just at that instant at which the mixture has reached its desired consistency, and being distributed (preferably automatically) directly to the points at which it is to be finally disposed.

Referring now more particularly to Figures 1 and 4 it will be seen that the reference numeral 10 indicates a framework or scaffolding of any desirable type capable of acting as a guide for an elevator carriage 11 by preferably furnishing rails 12 adapted to co-operate with guide rollers or similar elements 13 rotatably secured to the carriage 11.

Referring more particularly to the said carriage it will be seen that the trough member 14 is swingingly carried upon a shaft 15 extending between the lower ends of the carriage 11 by means of links 16 having one of their ends secured to said shaft their opposite ends encircling said stub shafts 17 extending from the side walls of the said trough.

With a view of providing means which will normally prevent any movement of the trough with respect to the carriage 11 it will also be noted that I utilize a pair of hooks 18 having their shanks pivotally affixed as at 19 to the side members of the carriage, the hook portions thereof encircling the stub shafts 17 and thus supporting the center of the trough 14 to one side of the carriage 11.

According to my improved method the trough member 14 rests in its charging position in a ditch 20 so that the upper edges of this member lie at a point adjacent to the level of the supporting surface. By this arrangement the work of the operators is facilitated in that wheelbarrows or other suitable conveying means may have their contents readily dumped into the trough 14.

The proper amount of sand, gravel, cement or other ingredients forming the mixture may thus be poured into the trough 14 with the expenditure of a minimum amount of energy, and to provide a mechanism which will serve to thoroughly stir the ingredients together, it will be noted, reference being had to Figure 4 that I affix a paddle 21 or blades to the stub shafts 17, this blade having its ends affixed one to the inner ends of said stub shafts so that upon these shafts being rotated the mixture will be vigorously stirred and its ingredients thoroughly intermingled. The paddle is of a distorted S-shape as shown in Figure 4, the function of which is to provide a disturbance of the material alternately at the sides of the trough. The extreme portions of the S paddle are 180° apart, and the reader can readily picture the action.

Now with a view of furnishing means which will actuate the paddle blade 21, and a simultaneous elevating of the carriage 11, it will be seen, in the embodiment illustrated, that a drum 22 is affixed to one of the stub shafts 17, and this drum mounts when the carriage 11 is in its lowered position coils of cables or rod 23, the end of which is passed over a pulley 24 secured to the upper part of the framework 10, and connected to a power elevating mechanism (not shown).

Further the elevating drums 24 are secured preferably one to each of the stub shafts 17 and in the arrangement of the cable 25, illustrated in Figures 1 to 4, this cable has one of its ends secured to one of the elevating drums 24, its body passing upwardly therefrom over pulleys 26 affixed to the upper end of the framework 10, and thence downwardly, its opposite end being secured to the second elevating drum, it being noted in this connection that the coils of the cable 25 disposed upon both of the drums 24, are arranged in opposed relationship to the coils of the cable 23 arranged upon the drum 22.

Thus assuming that a pull is exerted by the hoisting machinery upon the cable 23 it will be appreciated that this pull will primarily result in a rotation of the drum 22, and a consequential turning of the mechanism member or paddle 21. This rotation will also obviously result in a rotation of the stub shaft 17, and by virtue of the fact that these members fixedly carry the elevating drums 24 in turn having the coils of the cable 25 disposed upon them, in opposed relationship to the manner in which the coils of the cable 23 are disposed upon the drum 22 that the cable 25 will be wound upon the drum 24. This action will necessitate a "climbing" of the elevating drums upon the cable 25, and by virtue of the fact that these drums are connected to the carriage 11 it will be understood that the entire carriage will be elevated. Further it will be understood that the more the ingredients within the mixing trough 14 are stirred, the more readily will the paddle 21 be capable of forcing its body through the mass. The common practice is to dump the various ingredients into the trough, for example the gravel, sand, cement and water, then start agitating them. At first it will be difficult to force the paddle through the mass and therefore the operating arrangement is such that the paddle is turned slowly. As the material becomes distributed uniformly it will be easier to force the paddle through and therefore the speed of rotation is increased. The rotational speed of the paddle is greatest when the point of discharge is reached, and this feature has the advantage of insuring the thorough commingling of the materials when they are about to be conducted to the mold. With a view of availing myself of this fact it will be seen that the speed of rotation of the mechanism member 21 will be increased the further the carriage 11 moves from the ground in that the thickness of the convolutions of the cable 23 will be decreased, thus increasing the speed of rotation of the drum 22, the more the cable 23 is unwound therefrom.

To now provide means which will serve to automatically introduce water into the mixture, after the latter has been stirred for just the proper length of time, it will be seen that the carriage 11 carries a tank 27 arranged above the trough 14, and this tank is adapted to contain a predetermined amount of water normally prevented from flowing therefrom through a perforated pipe 28 by means of a valve 29, as has been illustrated in Figure 6. This valve is preferably operated by a handle 30, which latter extends to a point adjacent the side members of the carriage 11. At a predetermined distance from the ground, a stop 31 lies adjacent the rails 12 of the framework 10, and upon the carriage 11 being elevated to the proper extent, the handle 30 will bear against the stop 31 resulting in an opening of the valve and a spraying of the water from the tank 27 through the perforations of the pipe 28, the paddle 21 stirring the mixture within the trough 14 with constantly increasing speed. The spray pipe extends at least over one dimension of the trough, in this instance only the length.

Now with a view of providing means serving to dump the trough 14, a secondary stop 32 is provided at a predetermined point above the stop 31, and this secondary stop is adapted to engage with that portion of the shank of the hook 18, which extends beyond the point of pivotal attachment 19, thus swinging the hook portion of each of these members out of engagement with the stub shafts 17, at each side of the trough, thus permitting the latter to be rocked around the shaft 15 by means of the links 16 connecting the same thereto.

Rails are preferably utilized at the point at which the trough 14 is dumped. Thus a member 33 presenting an upper and lower rail 34 is affixed to the side members of the frame 10, the upper rail preferably extending beyond the lower rail and into the path of travel of the outer end of the trough 14, at which point the trough 14 has rollers 35 secured to it. The outer end of the shanks of the hooks 18 will thus contact with the secondary stop 32 thereby effecting a release of the hooks and by virtue of the fact that the stub shafts are to one side of the rails 12 this will cause the line of pull afforded by the elevating drums 24 and cable 25 to immediately throw the outer end of the trough 14 forward so that the rollers 35 will contact with the upper rails 34 and the entire trough will be tilted to the position shown in Figures 2 and 3, the thoroughly prepared mixture within the same dumping into the hopper 36 provided for this purpose, it being noted in this connection that guide pulleys 37 are preferably affixed to the carriage 11, and constitute bearing points for the cable 25 when the trough 14 is tilted.

Thus it will be seen that the steps of my process set forth in the first paragraph of the specification proper are accomplished, and a return of the parts to their normal position may be effected by simply slacking the cable 23, the force of gravity acting immediately upon the carriage 11 and parts supported thereby, causing the carriage to move downwardly, the trough member 14 to swing upwardly so that the hooks 18 engage the stub shafts 17 and again rock the trough with respect to the carriage.

It is to be understood that the carriage is increasingly elevated as the higher the finished work progresses, and also that the ingredients should be stirred to exactly a predetermined extent, to achieve a finished mixture possessing just the proper consistency and with a view of accomplishing this, attention is invited to Figures 3, 4, 7 and 8.

To properly identify the position of the elevating cables necessary to accomplish the result desired, in the erection of the building 38, the three floors illustrated in this building are identified by the reference numerals 4, 7 and 8 corresponding to the disposition of the elevating cable 25 in Figures 4, 7 and 8. Thus, in Figure 4, it will be seen that the elevating cable 25 has its ends attached to the elevating drums 24 its body passing directly over the pulleys 26. This will result in just the proper amount of rotation being imparted to the paddle 21 upon the trough 14 being elevated to the floor 4 of the building 38. If the same arrangement of elevating cable were resorted to in the elevating and dumping of the hopper in the plane of the floor 7, the rotation imparted to the paddle 21 would be insufficient, while the rotation of the paddle which would occur upon the hopper reaching the plane of floor 8 would result in a mixture of extreme deficient qualities.

Thus if the hopper is to discharge a correct mixture at the elevation occupied by floor 7, the cable 25, although having its ends attached to the elevating drums 24 does not have its body passing directly over the pulleys 26, but is passed around a pulley 39 secured to the upper end of the carriage 11. This will obviously result in a decrease of the speed of elevation although the speed of the pull upon the cable 23 is maintained constant, and thus an equal amount of rotations will be imparted to the paddle 21 upon the trough moving to the plane occupied by floor 7, as would be the case if the said trough were moved to floor 4, according to the previous disposition of the cable 25, it being also noted that the ratio of the number of rotations remains constant to the time consumed in the elevating of the hopper, although the speed of elevation is decreased.

Thus, first the amount of time necessary for the preparation, and second the exact amount of stirring necessary for the preparation of this mixture are maintained constant, irrespective of the height to which the trough is to be elevated before its contents are discharged, in this connection attention being invited to Figure 8, it being noted that the same disposition of the elevating cable 25 corresponds in all particulars to the arrangement illustrated in Figure 7, with the exception that in addition to passing around the pulley 39, the cable is further passed around the pulley 40 affixed to the upper end of the frame work 10, this arrangement being necessary where the floor 8 is under construction, it being seen that this disposition of the parts will again result in a decrease in the speed of elevation on the part of the trough, although the number of rotations imparted to the paddle 21 will remain constant, and the time consumed between the initial lifting of the trough and the dumping of the contents therefrom will also remain equal.

Also it will be obviously understood that if the dumping operation is to occur in a different plane that the track member 33 and the stops 31 and 32 are moved to corresponding positions upon the framework 10.

From the foregoing it will be understood that the process utilized together with the apparatus specified constitutes a decided advance in the art in that primarily the amount of handling and the operators necessary for such handling are reduced to a minimum. Secondly, in that the mixture is always prepared to an exact predetermined consistency, and has its ingredients thoroughly mixed, the mixture being distributed to its points of ultimate distribution, automatically, and immediately upon the said mixture reaching the exact consistency which is necessary for uniform construction, this being true irrespective of the height of the structure being built and the consequent elevation to which the trough must be moved before its contents are dumped.

It will be understood that modifications of structure of the apparatus and steps in the process may be varied without departing from the scope of my claims, which are;

1. A process for preparing a cementitious mixture which includes the placing of suitable ingredients into a receptacle, simultaneously elevating said receptacle and stirring the contents automatically at an intermittently increasing speed.

2. A process for preparing a cementitious mixture which includes the placing of suitable ingredients into a receptacle, simultaneously elevating said receptacle and stirring the contents automatically at an intermittently increasing speed, and introducing fluid into said receptacle at a predetermined point in the elevation of said receptacle.

3. A process for preparing a cementitious mixture which includes the placing of suitable ingredients into a receptacle, simultaneously elevating said receptacle, stirring the contents thereof automatically at an intermittently increasing speed, introducing fluid into said receptacle at a predetermined point in the elevation of said receptacle, and automatically dumping said receptacle when the ingredients of said mixture have been thoroughly commingled.

4. The process of producing a cementitious mixture consisting of assembling the ingredients of the building material, conveying said ingredients to the point of pouring, mixing the ingredients during conveyance and increasing the speed of mixing as the point of pouring is approached, and introducing fluid in a spray to said material after a predetermined period of conveyance and continuing for a determined period thereafter.

5. The process of producing a cementitious mixture consisting of assembling the ingredients of the building material, conveying the materials to the point of pouring, mixing the ingredients during the entire period of conveyance and with increasing speed as the point of pouring is approached, locating a quantity of fluid in readiness for introduction to the said material, and introducing said fluid into said material in a spray beginning at the predetermined period of conveyance and ending with the exhaustion of the fluid supply.

6. A method of producing a cementitious mixture consisting of assembling the ingredients of the building material, conveying said material to the point of pouring, mixing the material during the entire period of conveyance and with increasing speed as the point of pouring is approached, disposing a quantity of fluid substantially coextensively with at least one dimension of the assembled material, and introducing said fluid in a spray into said material coextensively thereof as aforesaid beginning at a predetermined period of conveyance and ending with the exhaustion of the fluid supply.

7. Apparatus of the character described comprising a frame, a carriage movable on the frame, a trough mounted on the carriage, a paddle operable in the trough for mixing material, stub shafts carrying the paddle and extending from the trough, a hook mounted on the carriage engaging a stub shaft to hold the trough in a predetermined position said hook having an extended shank, a water tank above the trough having a valve with a handle, a primary stop on the frame adapted to engage the handle to open the valve after a predetermined movement of the carriage on the frame, and a second stop on the frame adapted to engage the extended shank of the hook to release the stub and permit the trough to dump.

8. Apparatus of the character described comprising a frame, a carriage movable on the frame, a trough mounted on the carriage, a paddle situated in the trough for mixing material having stub shafts projecting from the trough, a hook mounted on the carriage engaging a stub shaft to hold the trough in a predetermined position said hook having a shank extending to one side of the frame, a water tank mounted on the carriage above the trough, a valve for the tank having a handle extending to the opposite side of the carriage, a primary stop located in one position on the frame to be engaged by the handle for the opening of the valve and the discharge of water at a predetermined time in the movements of the carriage on the frame, and a secondary stop in another position on the frame to be engaged by the extended shank of the hook for the disengagement of the stub shaft permitting the dumping of the trough.

9. Apparatus of the character described comprising a frame, a carriage movable on the frame, a mixing trough mounted on the carriage, a water tank supported by the carriage above the trough, a perforated pipe beneath the tank substantially coextensive with the width of the trough, a valve adapted to control the flow of water to the pipe having a stem extending into proximity with the frame, a handle on the stem, and a stop carried by the frame adapted to be engaged by the handle to open the valve when the carriage has moved a predetermined distance on the frame.

10. Apparatus of the character described comprising a frame, a carriage movable on the frame, a trough, stub shafts extending from the trough, a shaft mounted on the carriage having links engaging the shafts to swingably support the trough on the carriage, and hooks pivotally mounted on the carriage adapted also to engage the stub shafts to keep the trough in a predetermined position.

11. Apparatus of the character described comprising a frame, a carriage movable on the frame, a trough, stub shafts extending from the trough, a shaft mounted on the carriage having links engaging the shafts to swingably support the trough on the carriage, hooks pivotally mounted on the carriage adapted also to engage the stub shafts to keep the trough in a predetermined position, means on the frame adapted to be engaged by portions of said hooks to release the trough for swinging, and means carried by the frame being then adapted to swing said trough and links on the shaft to dump the contents.

12. Apparatus of the character described comprising a frame, a carriage movable on the frame, a trough having stub shafts extending therefrom, a shaft mounted on the carriage having links engaging the stub shafts to swingably support the troughs on the carriage, hooks pivoted on the carriage engaging the stub shafts to sustain the trough in a predetermined position, said hooks having extending shanks, stops on the frame adapted to be engaged by said shanks to lift the hooks and release the stub shafts, dumping means extending from the frame including upper rails, and rollers carried by the trough adapted to engage said rails to swing the trough and links on said shaft to dump the contents.

13. Apparatus of the character described comprising a frame including rails, a carriage adapted to move on the rails, a trough having stub shafts, a shaft mounted on the carriage having links engaging the stub shafts to support the trough, hooks mounted on the carriage also engaging the stub shafts and holding them and the troughs at one side of the rails, a drum fixed on one stub shaft having the coils of a power cable wound thereon, a smaller drum fixed to a stub shaft having an end of a hoisting cable fixed thereto, a pulley over which said cable passes at the top of the frame, and means on the frame adapted to lift the hooks to release the stub shafts permitting the trough to swing on said shaft to a discharging position by virtue of the line of pull of the power cable being to one side of the rails.

14. Apparatus of the character described comprising a frame having rails, a carriage having rollers adapted to run on the rails, a trough supported by the carriage, means by which the trough is swingably mounted off center in respect to the frame, hoisting cables running to said off-centered trough and being adapted at a predetermined time to swing the trough into a discharging position, and guide pulleys affixed to the carriage situated in positions to receive the hoisting cables and form bearing points therefor when the trough is tilted.

VICTOR H. SCHLICH.